L. HIRSCHFELD.
CANDY PACKAGE.
APPLICATION FILED OCT. 5, 1915.

1,169,035.

Patented Jan. 18, 1916.

WITNESSES
Edw. Thorpe
B. Joffe

INVENTOR
Leo Hirschfeld
BY
ATTORNEYS

UNITED STATES PATENT OFFICE.

LEO HIRSCHFELD, OF NEW YORK, N. Y., ASSIGNOR TO STERN & SAALBERG CO., OF NEW YORK, N. Y., A CORPORATION OF NEW YORK.

CANDY-PACKAGE.

1,169,035.  Specification of Letters Patent.  Patented Jan. 18, 1916.

Application filed October 5, 1915. Serial No. 54,161.

*To all whom it may concern:*

Be it known that I, LEO HIRSCHFELD, a citizen of the United States, and a resident of the city of New York, borough of Manhattan, county and State of New York, have invented a new and Improved Candy-Package, of which the following is a full, clear, and exact description.

My invention relates to a candy package or roll.

An object thereof is to provide a package formed of individual or separate sections united by paraffined joints to prevent the sections from sticking together and whereby the individual sections can be easily separated when consuming the candy.

A further object of the invention is to provide an inexpensive and attractive package of candy the individual sections of which are maintained together, in addition to the paraffined joints, by a paraffined wrapper which maintains all of the sections in alinement and protects them from dust and the influence of the atmosphere.

Reference is to be had to the accompanying drawings, forming part of the specification, in which like characters indicate corresponding parts in all the views.

Figure 1:
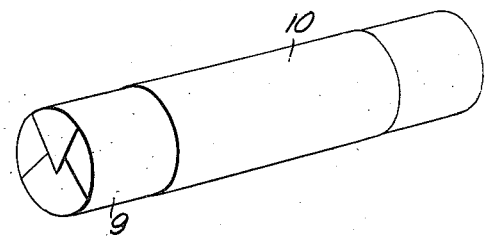
Figure 2:
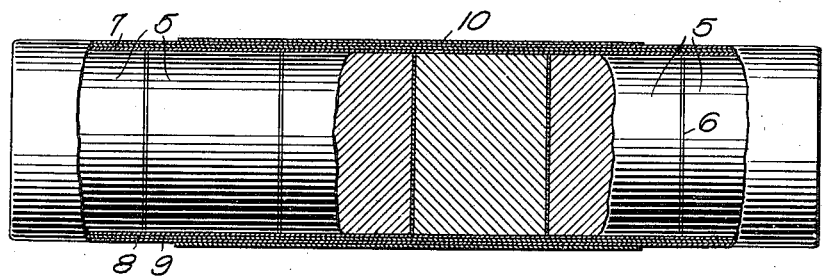
Figure 3:
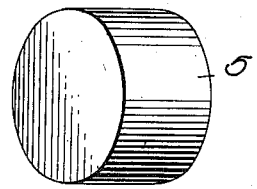
Figure 4:
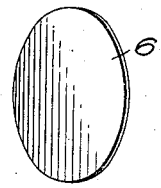

Figure 1 is a perspective view of my candy package; Fig. 2 is a side elevation of the candy stick, a portion of the wrapper and candy sections being broken out to better illustrate the structure of the stick; Fig. 3 is a perspective view of the package section; and Fig. 4 is a perspective view of a paraffined joint for uniting the sections.

Heretofore candy sticks have been made in a single piece. The disadvantage is self-apparent. Some tool is necessary for severing the stick into sections; and this necessity made the sale of large sticks of candy very limited and unprofitable. To overcome these defects many candy manufacturers have made candies in sections, each wrapped independently to prevent sticking and sold in a container, which rendered the resulting article very expensive, due to the work involved, and such articles could not be sold as a candy stick for they were not in the shape of a stick.

To overcome the above objections and produce a more marketable article having the shape of a stick, I have produced a candy package of several independent sections 5, preferably of cylindrical shape. The successive sections of the package are placed end to end, and to prevent sticking a paraffined joint in the shape of a disk 6 is interposed between the joined sections. The adhesion between the section and disk is sufficient to maintain the sections together, but a slight pressure on a section will detach the same from the adjoining section.

To render the joined sections sanitary, the same are wholly inclosed in a paraffined wrapper 7, which is further protected by a paper covering 8 and a tinfoil covering 9, a binding sleeve 10 being fitted over the tinfoil to reinforce it in the central part. The so-formed package of candy may be said to be formed of a plurality of candy rolls, which are the sections 5 joined by the paraffined disks into a single unit which is separable, without any tool, into its constituent sections when the wrappers thereof are removed partly or totally. This arrangement has the advantage of allowing a person to share the candy stick with another without the sanitary disadvantages normally encountered in the sharing of ordinary candy sticks, particularly when the sharing is done by children.

I claim:

1. A candy package comprising, a plurality of sections, uniform in size and shape, and united by transversal, separable joints which prevent direct contact between the adjoining sections.

2. A candy package comprising, a plurality of separate sections of uniform size and shape, and paraffined joints uniting the sections.

3. A candy package comprising, a plurality of separate, cylindrical sections of uniform size, paraffined disks uniting the ends of the adjoining sections, a paraffined wrapper inclosing all of said sections, and a protecting cover for said paraffined wrapper.

In testimony whereof I have signed my name to this specification in the presence of two subscribing witnesses.

LEO HIRSCHFELD.

Witnesses:
SAM'L F. WILLIAMS,
JACOB SAALBERG.